United States Patent [19] [11] Patent Number: 4,575,357
Taylor et al. [45] Date of Patent: Mar. 11, 1986

[54] FLEXIBLE COUPLINGS

[75] Inventors: Ivan Taylor, Davyhulme; John P. Harrington, Radcliffe, both of England

[73] Assignee: Flexibox Limited, Manchester, England

[21] Appl. No.: 491,436

[22] Filed: May 4, 1983

[30] Foreign Application Priority Data

May 21, 1982 [GB] United Kingdom ............ 8214807

[51] Int. Cl.$^4$ .............................................. F16D 3/60
[52] U.S. Cl. ..................... 464/69; 464/147; 464/160
[58] Field of Search .................. 464/69, 71, 137, 138, 464/147, 160

[56] References Cited

U.S. PATENT DOCUMENTS

| 2,551,837 | 5/1951 | Holloway | 464/69 |
| 3,246,485 | 4/1966 | Chapman | 464/71 |
| 3,481,158 | 12/1969 | Mayerjak | 464/69 |
| 3,528,264 | 9/1970 | Chapman | 464/69 |
| 3,650,124 | 3/1972 | Chapman | 464/69 |
| 3,726,108 | 4/1973 | Geislinger | 464/69 X |
| 3,739,600 | 6/1973 | Pere | 464/69 |
| 3,922,884 | 12/1975 | Chapman | 464/160 X |
| 3,972,205 | 8/1976 | Schmidt | 464/69 |
| 4,086,787 | 5/1978 | Koch | 464/69 |
| 4,118,952 | 10/1978 | Kobayashi | 464/69 |
| 4,321,805 | 3/1982 | Bossler, Jr. | 464/69 |

FOREIGN PATENT DOCUMENTS

| 0034440 | 8/1981 | European Pat. Off. | 464/138 |
| 2100052 | 7/1972 | Fed. Rep. of Germany | 464/69 |
| 2617142 | 10/1977 | Fed. Rep. of Germany | 464/69 |
| 1177883 | 4/1959 | France | 464/147 |
| 240259 | 1/1925 | United Kingdom . | |
| 282022 | 4/1928 | United Kingdom . | |
| 573709 | 12/1945 | United Kingdom . | |
| 731814 | 6/1955 | United Kingdom . | |
| 795640 | 5/1958 | United Kingdom . | |
| 840682 | 7/1960 | United Kingdom . | |

Primary Examiner—Stuart S. Levy
Assistant Examiner—Daniel P. Stodola
Attorney, Agent, or Firm—Bacon & Thomas

[57] ABSTRACT

A flexible coupling for disposition between two rotating shafts to reduce transmission of vibration or to increase the torque and speed range of the coupling for a given level of vibration transmission comprises input and output members connectible to driving and driven shafts and interconnected by a spacer via coupling elements which are flexible in the plane of rotation by centrifugal force and by torque transmitted through the coupling, such that, over a range of speeds and torques the spacer is relatively rotatable to at least one member.

A secondary coupling is also disclosed to render radially rigid a primary coupling comprising input and output members and coupling elements. The secondary coupling may comprise a bearing or a plain bearing, a multiple bearing or a cross links flexural pivot.

4 Claims, 14 Drawing Figures

FIG. 2.
PRIOR ART

FIG. 3a.
PRIOR ART
CONSTANT SPEED.

FIG. 3b.
PRIOR ART
CONSTANT SPEED.

FLEXIBLE COUPLINGS

TECHNICAL FIELD

This invention relates to flexible couplings between rotary shafts and particularly to those which transmit a mean torque but do not transmit or at least reduce the transmission of, fluctuations in that torque should they occur.

BACKGROUND ART

U.S. Pat. Nos. 3,528,264 and 3,922,884 disclose such couplings and they comprise an input member connectible to a driving shaft and an output member connectible to a driven shaft, said members being interconnected by flexible coupling elements which are deformable in the plane of rotation by torque transmitted by the coupling and by centrifugal force acting on the coupling elements such that over a range of speeds and torques one member is relatively rotatable with respect to the other.

It has been theoretically proven and experimentally confirmed that if a coupling having zero torsional stiffness be connected between two parts of a rotating system and be capable of transmitting a torque, then, if one part of the system be subjected to torques fluctuating even violently above and below a mean torque, the torque transmitted to the other part of the system will be the mean torque completely devoid of any fluctuations above or below the mean torque.

It has also been proven and experimentally confirmed that if the ratio of the torsional stiffness of a coupling to a mean torque being transmitted at any time (referred to as the "S/T ratio") has a low value, then, if the one part of the rotating system be subjected to torque fluctuations of a given value above and below the mean value, the value of the torque fluctuations transmitted through the coupling to the other part of the system will be almost directly proportional to the S/T ratio. Thus, if the S/T ratio at the time, speed, and mean torque considered be zero, there will be no transmitted torque fluctuations, irrespective of the fluctuations on the transmitting side. If on the other hand the S/T ratio has a relatively high value—say 50 or more—the coupling will have little effect in reducing the transmitted fluctuations.

At intermediate values the coupling will transmit a proportion of the fluctuations imposed on it.

The coupling characteristics of the coupling described in our U.S. Pat. No. 3,922,884 are such that it maintains a minimum S/T ratio whilst running along its design power/speed line which equates to the well known power cube law relationship. The design line can be varied by altering the geometrical structure of the coupling, but, deviation from this line at a given speed will result in an increase in S/T ratio. This ratio will remain low i.e. below 10 for a range of torques at any given speed.

It is therefore an object of this invention to provide a coupling which has an S/T ratio which is low over a wider range of torques and speeds than has hitherto been thought possible with existing couplings. Alternatively, the invention provides a coupling which has lower S/T ratios, over a comparable torque and speed range, than has hitherto been thought possible with existing couplings.

SUMMARY OF THE INVENTION

In accordance with a first aspect of this invention there is provided a coupling comprising input and output members respectively connectible to rotary driving and driven shafts and a concentric spacer which is connected to both the input and output members by respective coupling elements which are flexible in the plane of rotation by torque transmitted through the coupling and by centrifugal force acting on the coupling elements such that, over a range of speeds of rotation of the coupling and torques being transmitted by the coupling, the spacer is relatively rotatable to at least one member.

This coupling benefits from the combined effects of what is essentially two coupling units joined in series and these effects have been found to be much more beneficial than might initially have been expected. We have found that, while each unit affects the operation of the other, the S/T ratio of the combined coupling is always less, i.e. the coupling is softer, than the coupling would be if, for the speeds and torques being considered, the softer of the two coupling units was used by itself. Thus the coupling as a whole is operable over the ranges of operation of each coupling unit and not just over some mean range.

Furthermore, if each coupling unit has the same range of torques and speeds for a given S/T ratio then the combined coupling will have, at any given speed and torque, a smaller S/T ratio than either individual coupling unit at that speed and torque. This also means of course that for the same S/T ratios wider limits of torque and speed can be accommodated by the coupling.

The present invention also permits variations and additions to the basic design. For instance it is feasible to include counter centrifugal means in one or both coupling units to counter the effect of centrifugal force on the coupling elements and thus to bias them towards a position which they would adopt when the coupling was at rest. This gives the coupling a degree of rigidity at all speeds and hence prevents or at least subdues the effects of backlash.

It is also feasible and in some applications desirable to bias the coupling elements towards a position the coupling would adopt when transmitting no torque at speed and thus to counter the effect on the coupling elements of torque being transmitted by the coupling.

The coupling elements may each comprise two links pivoted to one another in the plane of rotation and at their other ends to one member and the spacer respectively.

Each coupling unit has no lateral rigidity however and hence to put the invention into effect, the spacer must be laterally, that is to say, radially supported.

Thus it is a further object of this invention to provide a coupling unit such that when two are joined in series, the spacer between them, unless it is very long, does not require any further radial support.

In accordance with a second aspect of this invention there is provided a coupling comprising input and output members connectible respectively to rotary driving and driven shafts, the input and output members being interconnected firstly by coupling elements which are flexible in the plane of rotation by torque transmitted through the coupling and by centrifugal force acting on the elements such that, over a range of speeds of rotation of the coupling and torques being transmitted by the coupling the input and output members are relatively rotatable, and secondly by a secondary coupling which is substantially radially rigid. Preferably said secondary coupling is also rotationally free.

Because such a coupling is in itself radially rigid two such couplings according to this second aspect of the invention may be joined in series to form a coupling according to the first aspect of the invention without the necessity of any further radial support for the spacer formed by the output member of the first coupling being joined to the input member of the second.

The coupling according to the second aspect of this invention can also be used in conjunction with other couplings which may be angularly flexible and which could not normally be used with couplings according to the invention unless radial support was provided for the spacer between them.

Preferably said secondary coupling comprises a bearing disposed between axial interjacent flanges of each member.

Such a coupling arrangement may be constructed so as to have a certain amount of loose radial play whereby the coupling can accept a small amount of lateral misalignment between the members before the whole coupling becomes radially stiff thus preventing further radial misalignment.

A further problem which may sometimes occur with existing couplings is the difficulty in dealing with residual axial thrusts from couplings which absorb main axial thrusts experienced through heating and expansion of shafts etc during running or indeed simply through the meshing of gears. Hitherto such residual thrust is absorbed by the coupling elements connecting the two members. However this puts an added strain on these elements causing them to wear quickly. Our coupling disclosed in European Published Patent Application No. 34,440 can flex with axial thrusts but cannot itself impart a counter thrust.

Thus in a coupling according to the second aspect of this invention the secondary coupling may also be axially rigid. Where the secondary coupling is a bearing disposed between axial interjacent flanges of each member the bearing is preferably a thrust bearing.

On the other hand however, it may not in some circumstances be desirable to resist axial expansion of shafts etc and thus impose perhaps unnecessary loads on bearings and couplings. In which event, contrary to the above, it may be preferable that a coupling according to the second aspect of this invention has a secondary coupling which is axially free so as to allow such expansion, In this event of course the coupling elements must be capable of accepting axial movement and coupling elements which would satisfy this criterion are disclosed in our European Published Patent Application No. 34,440.

The bearing may be in the form of a ball race bearing or in the form of a plain bearing. Where the coupling is to be axially rigid either bearing can be arranged with spherical seats to absorb and counteract axial thrusts. Where spherical seats are provided, although the resultant coupling is axially rigid it is nevertheless capable of accepting a degree of angular misalignment between the two members. Thus when used in accordance with the first aspect of this invention the resultant coupling can accept a net lateral misalignment between the two shafts since each coupling unit is able to misalignment. Clearly the longer the spacer between the input and output members the greater amount of lateral misalignment which can be accommodated between the shafts.

In this instance however there is no benefit to be gained by resisting axial expansion of the spacer and consequently axial freedom would in this case be desirable. This could be achieved if the bearing races were slidable in their housings.

An alternative embodiment provides a secondary coupling which comprises a cross link flexural pivot coupling which is radially stiff and which within limits is rotationally free. Such a secondary coupling may however provide counter torque means for the coupling.

BRIEF DESCRIPTION OF THE DRAWINGS

The invention is further described hereinafter with reference to the accompanying drawings, in which:

FIG. 1a is a partial section through a simple torsionally free coupling along the line A—A in FIG. 1b, FIG. 1b showing a sectional view along the line B—B of FIG. 1a;

FIG. 8a shows another embodiment according to a third aspect of this invention which is a section along the line 8A—8A in FIG. 8b, FIG. 8b showing the same embodiment in section along the line 8B—8B in FIG. 8a.

DETAILED DESCRIPTION OF THE INVENTION

Figure 1A:
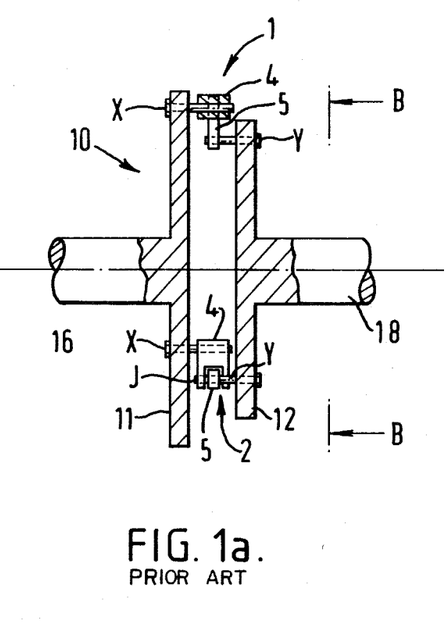
Figure 1B:
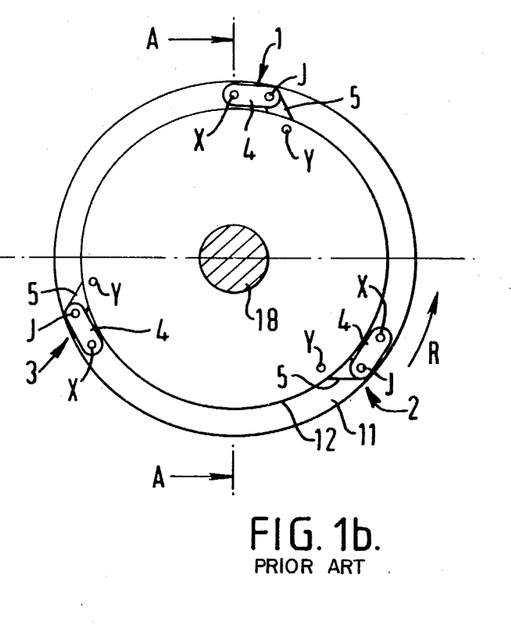

In the drawings FIGS. 1a and 1b show a coupling 10 comprising an input member 11 and an output member 12 connected to respective shafts 16,18. The shaft 16 is, in this coupling 10, the driving shaft and it drives in the direction of the Arrow R in FIG. 1b.

The two members 11,12 are interconnected by a plurality of coupling elements 1,2,3 which each comprise a pair of links 4,5 pivotally interconnected at point J. The links 4,5 are pivotally connected to the members 11,12 at respective points X,Y.

Figure 2:
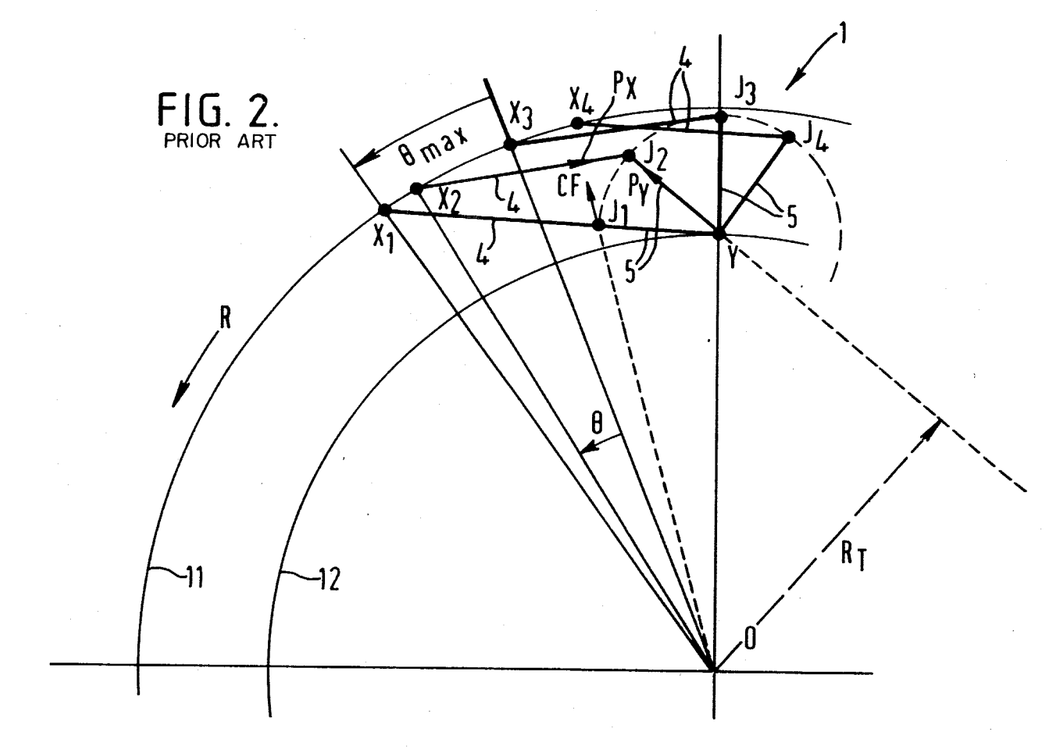
FIG. 2 is a detailed diagramatic representation of part of a torsionally free coupling as shown in FIGS. 1a and b.

Turning to FIG. 2, a number of relative rotational positions of the members 11,12 are shown (the member 12 being taken as stationary) and the resultant positions of the links 4,5. Thus if the member 11 is rotated in a clockwise direction in the drawing relative to the member 12, thus representing the effect of centrifugal force, from a position where the point X is at $X_1$ to the point where X is at $X_4$, the pivot point J between the links 4,5 describes an arc from $J_1$ to $J_4$ around centre Y. In one coupling, assuming no external forces, the links may be free to move between any of the positions $X_1,J_1$, to $X_4,J_4$, but in another coupling counter torque means are provided to bias the links towards the position $X_1,J_1,Y$.

In any event when the member 11 begins to rotate and drive in the direction of the Arrow R the links 4,5 adopt the position $X_1,J_1,Y$. Here the coupling 10 is stiff.

As the speed of rotation increases centrifugal force C.F. acts on the links 4,5, effectively at pivot J tending to throw them away from centre 0 and towards the position $X_2,J_2,Y$. The centrifugal force applies forces $P_X,P_Y$ along the links 4,5 respectively and towards the point J. Assuming the coupling is transmitting a mean torque T, then in the steady state condition, the forces $P_X,P_Y$ in the links 4,5 apply torques to the members 11,12 equal and opposite to the torque T. The turning moment T about centre 0 of the member 12 is given by the product of $R_T$, the radius of application of the force $P_Y$ about centre 0, and the force $P_Y$.

If the torque T is reduced however, while maintaining the same speed, the torques applied by the forces $P_X,P_Y$, on the members 11,12, will exceed the torque T applied to these members. Consequently the turning moment on member 12 will rotate it about centre 0 relative to the member 11 and the links will move towards the position $X_3,J_3,Y$. As the links 4,5 move towards this position the resultant force $P_X$ in the link 4 becomes smaller as the angle of the link 4 with the centrifugal force approaches right angles. Moreover the torque applied by the force $P_Y$ on the member 12 is reduced as the link 5 approaches the radial position and hence $R_T$ tends to zero. Thus by moving towards $X_3,J_3,Y$ a new balance of forces is established.

If the torque T becomes zero then the links will occupy the position $X_3,J_3,Y$ where the link 5 is radial and can no longer apply a torque to the member 12.

It is likely however that if the torque T is suddenly removed from the coupling the inertia of the links moving towards position $X_3,J_3,Y$ would carry the links past this position and on towards position $X_4,J_4,Y$. It will be noted here however that the direction of the force $P_Y$ on the member 12 is reversed so tending to restore the links 4,5 to the zero torque position at $X_3,J_3,Y$.

From this position if the load on the member 12 is restored and increased to infinity the links will move through positions $X_2,J_2,Y$ to $X_1,J_1,Y$. Thus when X is at $X_3$ the system is said to be at zero deflection. When at $X_2$ the system is deflected by $\theta$ degrees and when at $X_1$ through the maximum possible deflection of $\theta_{max}$ degrees. When at $X_4$ the system is said to be negatively deflected.

Figure 3A:
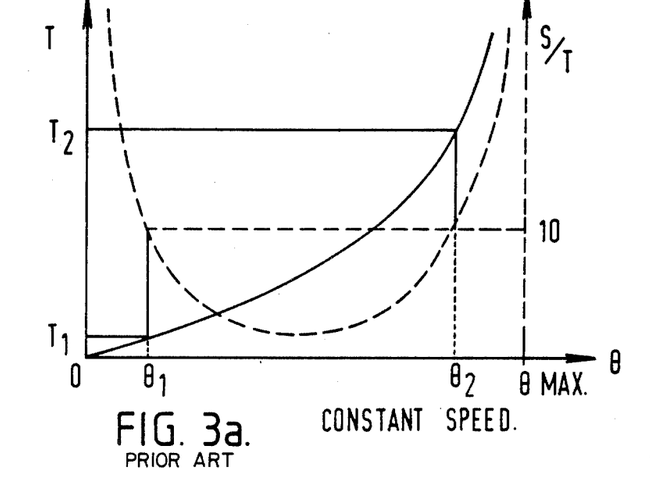
FIG. 3a is a graph of the deflection characteristics of a coupling as shown in FIGS. 1a and b, FIG. 3b showing the same characteristics in the form of a graph of S/T ratio versus torque T transmitted at constant speed.

The torque characteristics of a given coupling are shown in FIG. 3a in which the Torque T across the coupling is plotted against the deflection $\theta$ of the coupling at a given constant speed above zero.

When $\theta$ is zero no torque is transmitted. When $\theta$ tends to to $\theta_{max}$, the torque transmitted approaches the maximum transmissable torque. The shape of the line between these two extremes is, at any constant speed, dependent on the physical nature of the coupling, that is to say, on the length of the links 4,5, on their weight and on their points X,Y of attachment to the members 11,12 (i.e. their radius of attachment).

On the same graph is also plotted the S/T ratio at each deflection. When $\theta$ is zero no torque is transmitted and hence the S/T ratio is high. When $\theta$ tends towards $\theta$ max the coupling approaches infinite stiffness and so the S/T ratio is also high. At intermediate points the S/T ratio is less and may be as little as 2 or less at a certain deflection.

As already mentioned if a coupling has an S/T value less than 10 it will be soft for most applications and will not transmit fluctuations from one member to the other.

From FIG. 3a it can be seen that between deflections $\theta_1$ and $\theta_2$ the S/T ratio is less than the nominal maximum of 10. At the given constant speed between these two deflections the torques on the coupling vary between $T_1$ and $T_2$.

In other words at the constant speed in question the coupling remains soft when the torques transmitted by the coupling vary between $T_1$ and $T_2$.

Figure 3B:
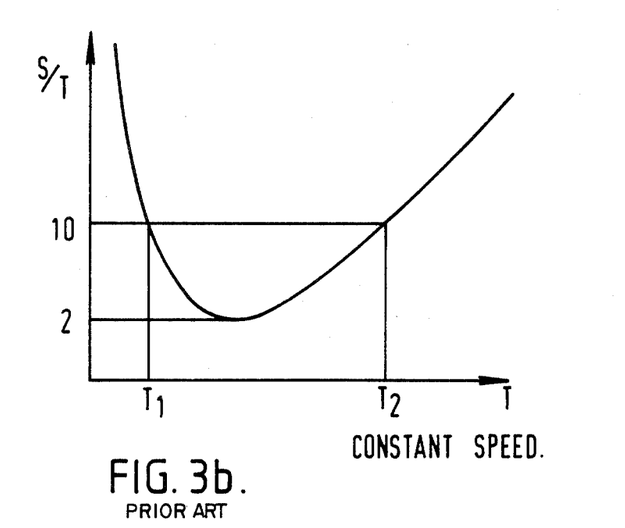

For a given coupling and at constant speed it is possible to plot the S/T ratio against the torque T being transmitted. This is shown in FIG. 3b and for S/T values less than 10 the torque must remain between the same torques $T_1$ and $T_2$ as shown in FIG. 3a.

Figure 4:
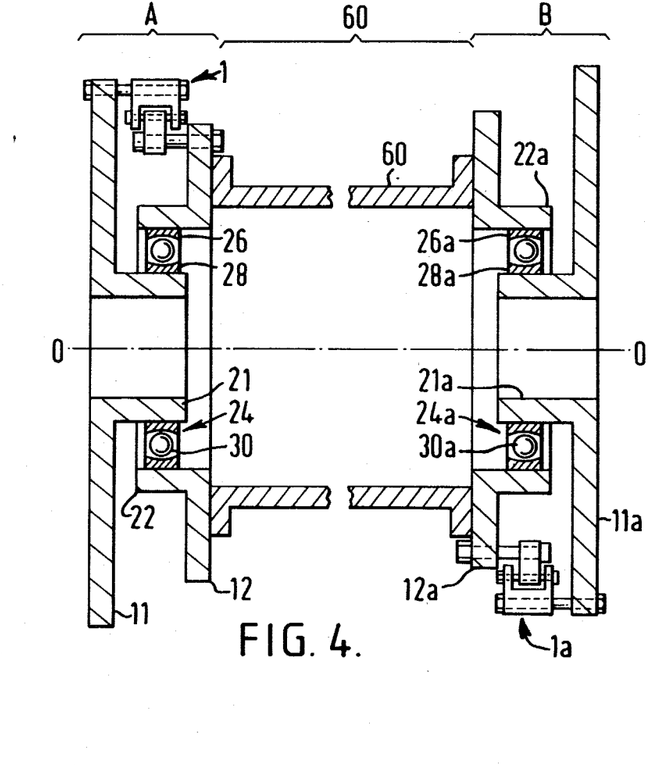
FIG. 4 is a section through a coupling according to the first aspect of this invention, FIG. 4a showing how this coupling incidentally can accept lateral misalignment between the shafts it connects.
Figure 5:
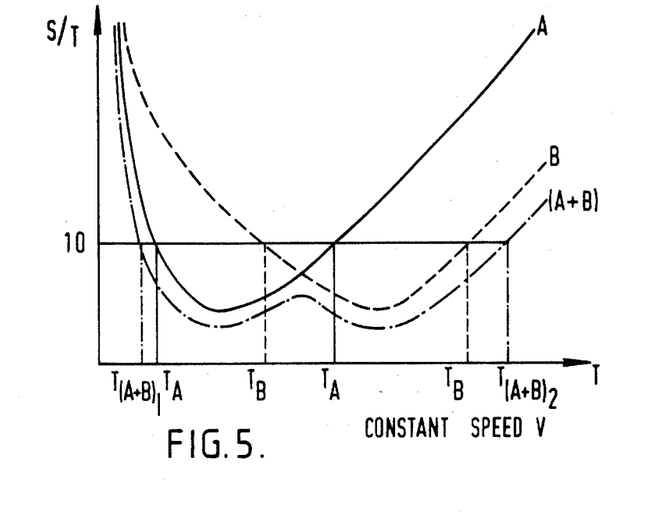
FIG. 5 shows the same characteristics as shown in FIG. 3b but for the coupling illustrated in FIG. 4.

FIG. 4 shows a coupling in accordance with the first aspect of the present invention. The coupling comprises two coupling units A,B of the type described with reference to FIGS. 1 to 3 (like reference numerals being used for corresponding elements) joined together via a spacer 60. Each coupling unit A or B comprises members 11 and 12 which are interconnected by coupling elements 1 (only one of which can be seen). FIG. 5 is a plot of S/T ratios versus torque transmitted for the coupling of FIG. 4. Line A represents the curve for the coupling A acting individually while line B represents that for coupling B acting individually.

The fact that these curves are not coincident may simply be explained in that the coupling unit B has heavier coupling elements 1,2,3 than those of A. This means of course that greater torque must be exerted to obtain the same deflection of the links 4,5 in view of the fact that the centrifugal forces and hence the forces $P_X,P_Y$, as mentioned with reference to FIG. 2, would be greater. Other parameters could result in the same effects however. For example longer links 4,5 and greater radial distances from centre 0 of the points X,Y in the coupling unit $\theta$ would have the same effect.

In any event, taking a nominal limit of 10 for the S/T ratio, it will be noted that for coupling A at constant speed V the coupling is below this limit over a torque range of $T_{A1}$ to $T_{A2}$. Similarly, for the coupling $\theta$ the range is $T_{B1}$ to $T_{B2}$. Beyond these limits however the couplings get larger S/T ratios and so transmit more vibration. Thus for torques greater than $T_{A2}$ the coupling A would not be efficient at the speed V in question. Similarly for torques less than $T_{B1}$ at speed V the coupling B would not be efficient either.

The curve (A+B) shows the S/T ratio at speed V for various torques of the compound coupling A,60,B. As can be seen, this curve is not a mean curve for A or B, nor even simply the sum of the two but is in fact even better than that. A possibly reasonable comparison may be made with springs but even these do not show the same characteristics. For instance when two springs are nested in parallel the resultant compound spring is stiffer than the stiffer of the two springs. In fact, the stiffness S of the pair is related to the stiffnesses $S_1,S_2$ of the individual springs by the simple formula $S=S_1+S_2$.

The mass that can be accommodated in compression of the springs is simply the sum of the masses which can be accommodated by each spring individually. When connected in series however the stiffness of the resulting pair is given by the formula:

$$\frac{1}{s} = \frac{1}{s_1} + \frac{1}{s_2}$$

Although this results in a less stiff spring, it requiring less mass to give a certain deflection, it nevertheless can accommodate no greater mass than can the stiffer of the two individual springs.

When two coupling units of the type referred to were joined in series we found that the resulting stiffness $S_{(A+B)}$ was related to the stiffness $S_A$ and $S_B$ by the same formula, thus:

$$\frac{1}{S_{(A+B)}} = \frac{1}{S_A} + \frac{1}{S_B} \qquad \text{I}$$

At at a given torque and speed therefore the S/T ratio was given by:

$$\frac{1}{(S/T)_{(A+B)}} = \frac{1}{(S/T)_A} + \frac{1}{(S/T)_B} \qquad \text{II}$$

Plotting $(S/T)_{(A+B)}$ on the graph in FIG. 5 we find it stays below the curves of A and B, and in this instance stays below the nominal S/T value of 10 from torque $T_{(A+B)1}$, which is less than $T_{A1}$, to torque $T_{(A+B)2}$, which is greater than $T_{B2}$. That is to say, the resultant coupling can accommodate torques over a range not only greater than one or other of the two couplings but in fact over a range greater than the sum of the ranges of the two individual couplings. Moreover, within the range $T_{A1}$ to $T_{B2}$ the resultant compound coupling is significantly softer—i.e. has smaller S/T ratios—than either individual coupling.

Figure 6:
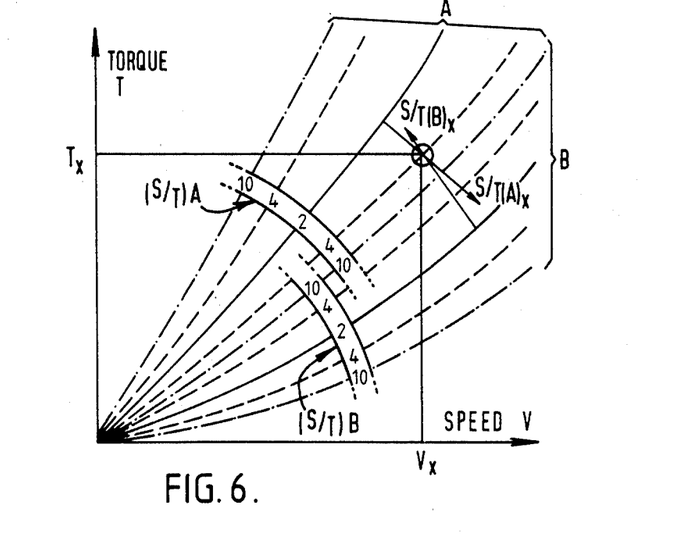
FIG. 6 shows graphically the range of speeds V and torques T for specific S/T values for the coupling of FIG. 5.

FIG. 6 illustrates the complete characteristics of a given coupling. Here the speed V of the coupling is plotted against the torque T transmitted by the coupling. For any given torque and speed the coupling will have a given S/T ratio and the curves on the graph represent lines of equal S/T ratio. For the coupling A, for instance, the solid line represents that set of values of torque T and speed V at which the coupling has its lowest S/T ratio, which in this case is 2. On either side, dotted lines represent S/T ratios equal to 4 and so on.

A similar graph can be plotted for the coupling B only for this coupling the speeds and torques at which the S/T ratio is the minimum, say 2 again, are different to those for the coupling A. Also as the speed increases or decreases for a given torque from any point on the solid line, or as the torque increases or decreases for a given speed from any point on that line, the S/T ratio increases. It increases slowly at first but then exponentially. Thus at any speed $V_X$ and any torque $T_X$ it is possible to approximate the S/T ratio of each coupling.

For the coupling A, the point $V_X, T_X$ falls approximately on the line where the S/T ratio is equal to 4 and thus $S/T_{AX} = 4$.

For the coupling B, the point $V_X, T_X$ falls outside of the S/T = 10 line and hence will be at a value where the S/T ratio will be greater than that, say at a value where $S/T_{BX} = 50$.

From formula II above the S/T ratio $S/T_{(A+B)X}$ for the compound coupling A,60,B is given by:

$$\frac{1}{S/T_{(A+B)X}} = \frac{1}{S/T_{AX}} + \frac{1}{S/T_{BX}}$$

$$= \frac{1}{4} + \frac{1}{50}$$

$$S/T_{(A+B)X} = 3.7.$$

Thus even where the coupling B is itself, to all intents and purposes, stiff it is because it retains a degree of flexibility that the S/T ratio of the coupling A is significantly reduced in the combined coupling A,60,B.

It will be appreciated therefore that the combined effect of two such couplings gives the resultant combined coupling a wider scope of use than might reasonably be expected.

It is not however quite straightforward to join two couplings in series, and as mentioned above the second aspect of this invention provides coupling units which have lateral or radial rigidity and hence can simply be joined in series in accordance with the first aspect of the invention.

Figures 7A, 7B, 7C:
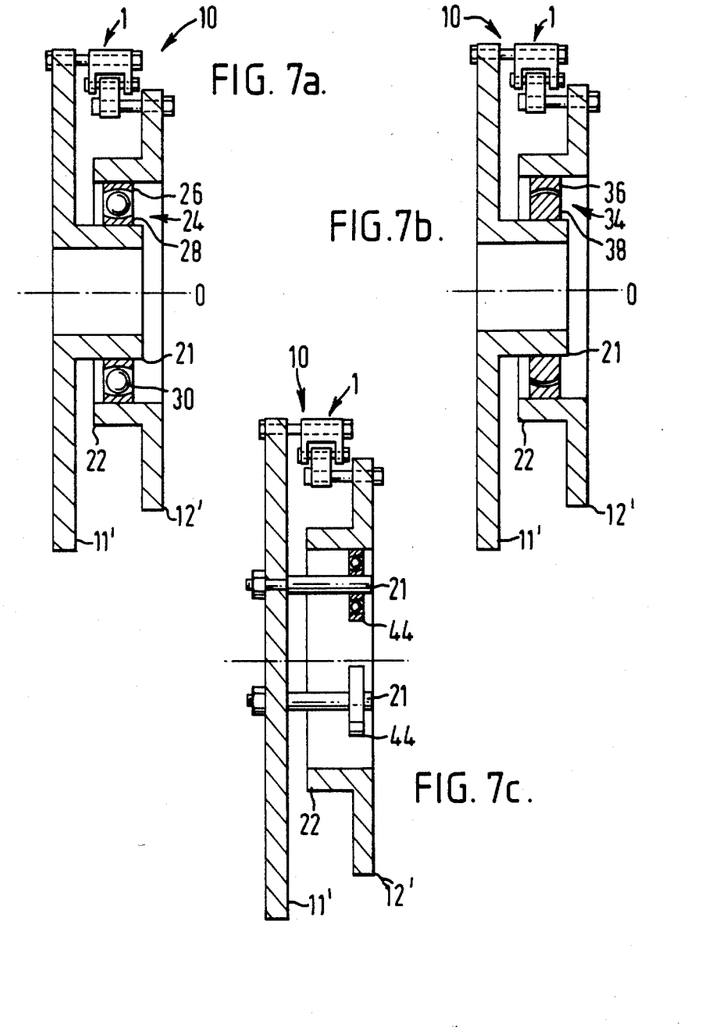
FIGS. 7a, 7b, 7c show in section various embodiments according to the second aspect of this invention.

Referring to FIGS. 7a to 7c, in the coupling units 10 the members 11' and 12' have interjacent axial flanges 21 and 22 respectively which support therebetween means for imparting lateral rigidity between the two members 11' and 12'.

In FIG. 7a these means comprise a ball bearing assembly 24 which has an outer race 26 mounted internally of the flange 22 and an inner race 28 mounted externally of the flange 21. Balls 30 are disposed between the races 26,28.

In FIG. 7b however these means comprise a bearing assembly 34 having bearing seats 36,38 disposed internally of the flange 22 and externally of the flange 21 respectively. These seats 36,38 have low friction surfaces.

In both the aforementioned embodiments the respective seats 26,28 and 36,38 are spherically arranged for two reasons. Firstly because the arrangement can then accept a certain amount of angular misalignment between the two members 11,11' and 12,12'; at least as much as the coupling element 1 can accept (even when this element is as described in European Published Application No. 34,440). Secondly these bearings can serve as thrust bearings and so absorb any residual axial thrust between the members 11,11' and 12,12' which may arise.

This means that no strain is placed on the coupling elements themselves (only one of which is shown).

In FIG. 7c a slightly different arrangement to that of FIG. 7a is shown. Here the flange 21 comprises a plurality of rods or the like attached to the member 11' and which carry individual bearings 44 arranged to roll inside the flange 22. At least three of such bearings 44 arranged circumferentially inside the flange 22 would provide an adequate degree of lateral rigidity in all directions.

Figure 8A:
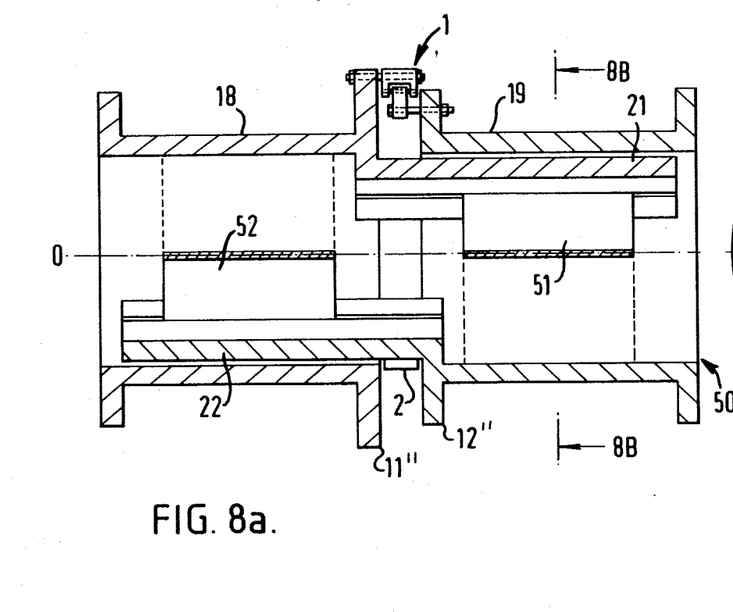
Figure 8B:
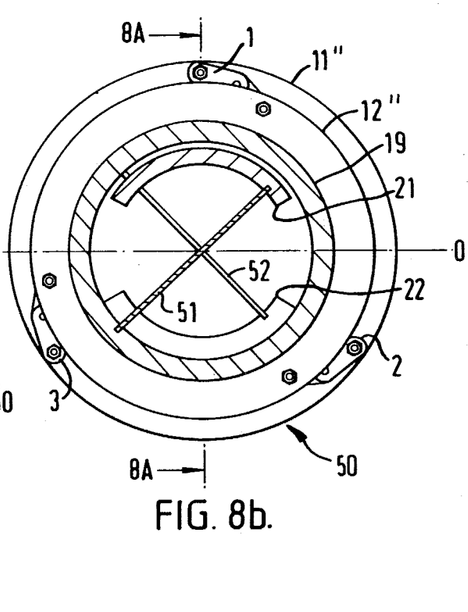

FIGS. 8a and 8b illustrate the use of a cross link flexural pivot coupling 50 to provide the radial rigidity for the members 11' and 12". The pivot coupling 50 comprises the two members 11",12" having tube sections 18,19 respectively and between which are disposed the coupling elements 1,2,3 as in previous embodiments. The members 11",12" have respective interdigitating flanges 21,22. Diametrically between the flange 21 and member 12 is disposed a cross-link 51. Similarly, between the flange 22 and member 11" another cross-link 52 is also disposed but preferably at right angles to the first cross-link 51 as can be seen from FIG. 8b. The theory of cross-link pivots is well documented in for instance a paper by Nickols and Wunsch which appeared in "Machinery" at Page 645 of Vol. 79 dated Oct. 11, 1951. Thus it will be apparent to those skilled in the art that while offering little resistance to relative rotation about centre 0 of the members 11 and 12, the pivot coupling 50 is nevertheless laterally rigid. Furthermore, by appropriate choice of the cross-links 51,52 it is possible to arrange that these provide the counter torque means referred to above which can be used to alter the performance of the coupling in its role as a torsionally free coupling.

Figure 4A:
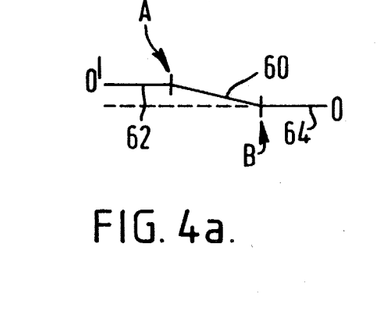

Referring back to FIG. 4, the combined coupling A,60,B is in fact two couplings of the type described above with reference to FIG. 7a connected together by torque tube 60. Because the couplings A,B can each accept a certain degree of angular misalignment, the resultant compound coupling A,60,B can then accept a lateral misalignment between the shafts connected to the members 11,11a. This is schematically illustrated in FIG. 4a where two shafts 62,64 are laterally misaligned by 0—0'. The two couplings A and B, together with the torque tube 60, allow these two shafts to be connected. Clearly the longer the torque tube 60 is, the greater the misalignment between the shafts 62,64 which the compound coupling A,60,B is capable of accepting.

It should of course be appreciated that the couplings shown in FIGS. 7(a),(b) and (c) and 8 need not necessarily be connected in series with other couplings of the same type. Their lateral rigidity enables these couplings to be joined to other angularly flexible couplings or indeed by themselves merely between shafts one of which is laterally not rigid.

Furthermore it is possible for a number in excess of two couplings to be combined in tandem to produce an even broader operating curve.

What we claim is:

1. A flexible coupling comprising:

(a) an input member connectable to a driving shaft;
    (b) an output member connectable to a driven shaft axially spaced from the driving shaft;
    (c) a spacer means concentrically disposed between said input and output members to accommodate and bridge the axial spacing between the driving and driven shafts;
    (d) coupling elements connecting said spacer means to each member, each coupling element comprising two links connected to one another and at their other ends to the spacer means and respective member through pivots allowing rotation of the links in the plane of rotation of the coupling such that said spacer means is relatively rotatable in the plane of rotation of the coupling with respect to both members;
    (e) parallel interjacent axial flanges on and between the spacer means and at least one of said members defining an annular open-ended passage; and
    (f) a radially-rigid secondary coupling axially located within said annular passage between said interjacent axial flanges, the secondary coupling being in the form of a freely rotatable bearing comprising inner and outer race elements of spherical configuration engaging the said interjacent axial flanges whereby the spherical bearing not only allows angular misalignment between the said members but also serves as a thrust bearing to absorb any residual thrust arising between the said members.

2. A flexible coupling as claimed in claim 1, in which at least three coupling elements are evenly distributed about the axis of rotation of the coupling between the spacer means and each member.

3. A flexible coupling as claimed in claim 1, in which said bearing is a ball bearing.

4. A flexible coupling as claimed in claim 1, in which said bearing is a low friction plain bearing.

* * * * *